(12) United States Patent
Zhang et al.

(10) Patent No.: US 7,342,901 B1
(45) Date of Patent: Mar. 11, 2008

(54) MEDIUM ACCESS CONTROL (MAC) PROTOCOL FOR A WIRELESS COMMUNICATION SYSTEM

(75) Inventors: Hang Zhang, Nepean (CA); Gamini Senarath, Nepean (CA); Mo-Han Fong, L'orignal (CA); Bassam Hashem, Nepean (CA); Yoon Chae Cheong, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1043 days.

(21) Appl. No.: 10/115,083

(22) Filed: Apr. 4, 2002

Related U.S. Application Data (60) Provisional application No. 60/287,843, filed on May 1, 2001.

(51) Int. Cl.
*H04Q 7/00* (2006.01)
(52) U.S. Cl. ........................ 370/329; 370/342
(58) Field of Classification Search .............. None
See application file for complete search history.

(56) References Cited

U.S. PATENT DOCUMENTS

| | | | |
|---|---|---|---|
| 6,442,152 B1 * | 8/2002 | Park et al. ................... 370/341 |
| 6,456,604 B1 * | 9/2002 | Lee et al. .................... 370/328 |
| 6,463,044 B1 * | 10/2002 | Seo .............................. 370/329 |
| 6,473,419 B1 * | 10/2002 | Gray et al. ................... 370/349 |
| 6,519,266 B1 * | 2/2003 | Manning et al. ............ 370/469 |
| 6,731,948 B1 * | 5/2004 | Lee et al. .................... 455/522 |
| 6,804,219 B2 * | 10/2004 | Koo et al. ................... 370/335 |
| 6,882,632 B1 * | 4/2005 | Koo et al. ................... 370/335 |
| 6,928,289 B1 * | 8/2005 | Cho et al. ................. 455/452.2 |
| 6,931,026 B1 * | 8/2005 | Lee et al. .................... 370/468 |
| 2001/0010687 A1 * | 8/2001 | Lee et al. .................... 370/335 |

OTHER PUBLICATIONS

Flarion, Whitepaper, Jan. 2002, "Flash-OFDM Technology, Affordable Mobile Broadband Access", 23pgs., cite: section 3.6, p. 15, (http://www.flarion.com/technology/whitepaper.pdf).

* cited by examiner

*Primary Examiner*—Bob A. Phunkulh (57) ABSTRACT

A wireless communication system (100) includes a network (102), one or more mobile stations (103), and a medium access control (MAC) protocol (201). The MAC protocol (201) includes a state transition design (400) and a control channel design (500). The state transition design (400) includes null (401), dormant (402), standby (403), and active states (404) for each mobile station (103). The control channel design (500) includes a common control channel (501), a slow control channel (502) and a fast control channel (503), and is adapted to control communications from the network to each mobile station.

23 Claims, 9 Drawing Sheets

Table of Performance Comparisons 1000

| Technology | 1XRTT | 3GPP | HDR | New MAC Protocol |
|---|---|---|---|---|
| -fast MAC ch.<br>-slow MAC ch.<br>-common control ch. | Yes(Active)<br>No<br>Yes(Dormant) | Yes(Active)<br>No<br>Yes(Dormant) | Yes(Active)<br>No<br>Yes(Dormant) | Yes(Active State)<br>Yes(Standby State)<br>Yes(Idle) |
| MAC Channels & States -Dormant to Active | Slow (~3.6s) | Slow (>1s) | Slow t>500ms (Continuous monitor) or >~5s (sleep) | Fast (<100ms) (Highest QoS Level) |
| -Multiple QoS support | No | No | No | Yes |

FIG. 10

MEDIUM ACCESS CONTROL (MAC) PROTOCOL FOR A WIRELESS COMMUNICATION SYSTEM

RELATED APPLICATIONS

This application claims priority to U.S. Provisional Patent Application 60/287,843, filed May 1, 2001.

FIELD OF THE INVENTION

The present invention relates generally to wireless communication systems, and more particularly to a medium access control (MAC) protocol for a wireless communication system.

BACKGROUND OF THE INVENTION

A problem in exploiting the vast potential of the wireless Internet is that the wireless medium is prone to errors, rendering it unreliable for data. This has not impeded the widespread adoption of cellular services, because the voice application is not as sensitive to the vagaries of the radio frequency (RF) environment. As a result, cellular technologies have been optimized over the years for the voice application and its error threshold.

Data requirements dramatically differ from voice. As compared with wireless voice, data require several orders of magnitude improvement in error rates. This has not impeded the mass adoption of Internet access because the Internet itself was designed around the highly reliable connections available in present wired networks.

Delivering Internet services poses some unique challenges for the wireless industry. Cellular technologies are circuit-oriented and voice-optimized, resulting in low practical throughput and high latency for data applications. Latency is the time, represented in seconds (s), required to transfer a message between relevant devices in the network. Latency is the sum total of the delay introduced by the sender software, the delay introduced by the receiver software, the delay in accessing the network, the delay introduced by the network. Latency affects the transfer time of a message according to the following equation: message transfer time=latency+((length of message)/(data transfer rate)). Data transfer rate, represented by bits per second (bits/sec), is the speed at which data can be transferred between the sender and the receiver in a network, after transmission has begun. Length of a message is amount of information, represented by the number of bits, in the message.

Figure 10:
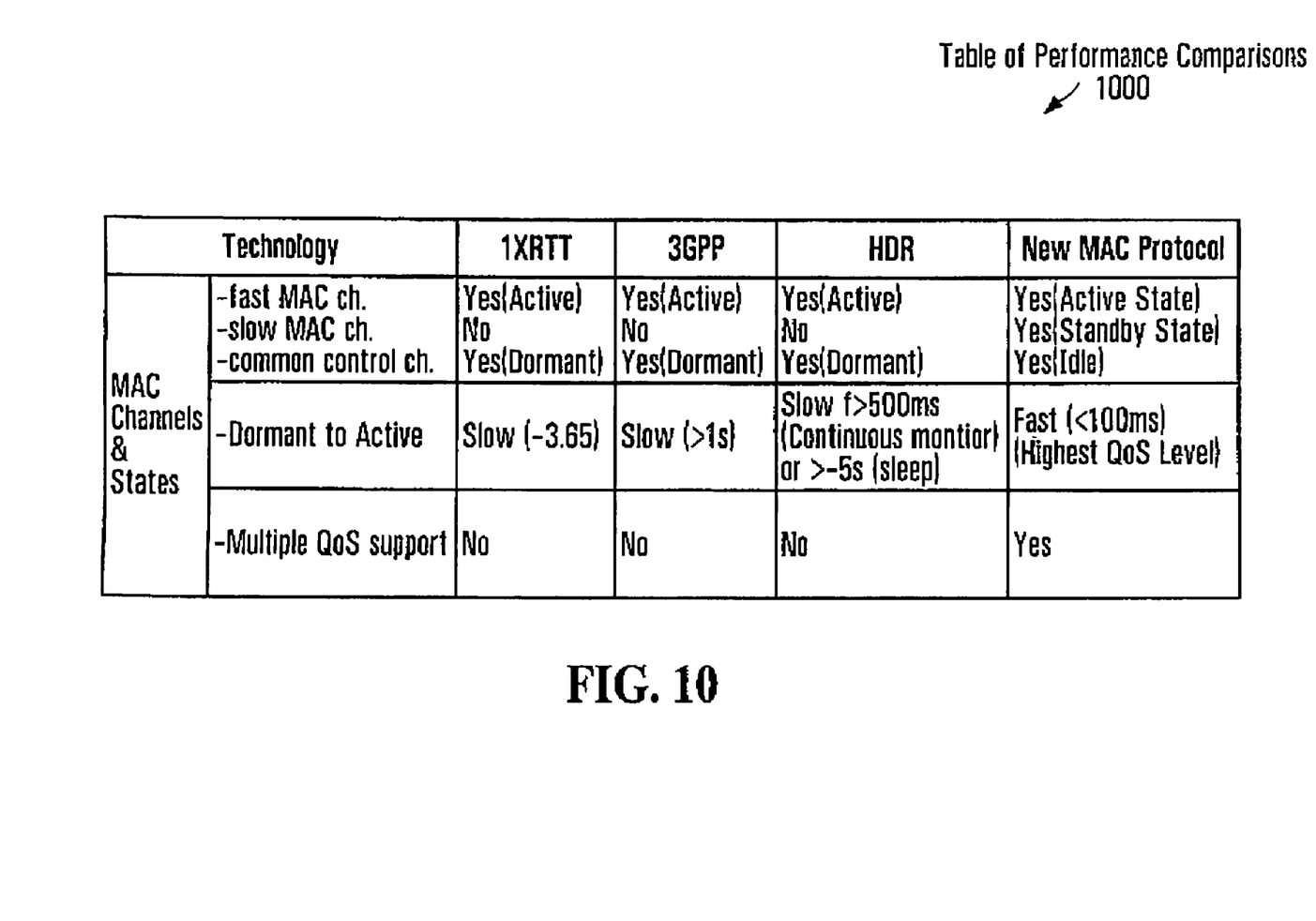
FIG. 10 illustrates a table comparing characteristics of conventional protocols to the MAC protocols, as shown in FIGS. 2-9, in accordance with the preferred embodiments of the present invention.

For example, in present wireless network standards (e.g., 1×RTT, 3GPP, HDR) that employ medium access control (MAC) protocol designs, a mobile station includes three states, a null state, an idle or dormant state, and an active state. In the active state, communication resources are allocated to the mobile station and data bursts pass instantly between the network and the mobile station. However, much of the communication resource allocated is not used due to the bursty nature of data traffic. Accordingly, mobile stations that are not actively transmitting data are moved from the active state to the idle state when data traffic has not occurred for a period of time. Then, if data traffic needs to be sent between the idle mobile station and the network, the mobile station needs to move from the idle state to active state before the data can be transferred. Typically, the delay introduced for moving the mobile station from the idle state to the active state is one to five seconds for each of the three wireless network standards, regardless of the Quality of Service (QoS) provided to the mobile station, as shown in FIG. 10. Such a long packet access delay does not meet the requirement for a mobile station to be "always on". Moreover, in the present wireless network standards, the QoS is predetermined and fixed or static, according to system engineering design considerations. Hence, in addition to the packet access delay, the fixed QoS may cause the mobile station to perform at a substandard level (e.g., additional delays and/or increased power consumption).

These problems have been addressed using several approaches. In a first approach, the network modifies the information content to fit the channel bandwidth (i.e., the "pipe"). Second and third generation (2G and 3G) cellular solutions incrementally add data capabilities to their hierarchical, voice-centric networks. In this approach, the application is re-defined around the existing wireless "pipe" by rewriting/thinning down the content and avoiding interactive applications, such as voice-over-IP (VoIP). This not only limits the user experience to a mere fraction of what's possible on the Internet but also comes at a hefty price premium because the immense content, applications and infrastructure of the Internet are not leveraged, but re-invented.

In a second approach the mobility of the mobile station is limited to increase data throughput. Some approaches address only one cause of data errors in a wireless environment—mobility. In this case, mobility is either prevented by employing fixed directional subscriber antennas, or by reduced by providing spot coverage and/or no handoff from cell-to-cell. These approaches either add significant cost and complexity (fixed user antennas, installation required) or limit the system's utility and revenue potential (limited coverage, no fully mobile applications).

In a third approach the network and/or the mobile station tunes the radio link to increase throughput over the communication channel. The wireless environment, more often than not, disrupts radio signals, resulting in transmission errors. Some wireless technologies attempt to repair the temporal characteristics (e.g., through equalizers) or spatial properties (e.g., though smart antennas) of the radio signals in real time. The result is a performance gain, but a proportional increase in system complexity. While these approaches can be applied to any air interface, they add significant cost and complexity.

Despite these limitations, network operators continue to move forward with plans to market mobile broadband data to enterprises and consumers because of the mass-market demand for mobile broadband services and the potential for profits. Ideally, a network should offer users a wireless broadband experience that has the same look and feel of wired broadband, with access to all existing web sites and applications. Practically, a network should realize profitable economics for the operator and a positive experience for the end user by meeting the following network characteristics. A network should support all existing wire line applications, with no changes to applications, devices, protocols, and content. A network should achieve significant profitability for operators and manufacturers in a high usage, flat-rate environment. A network should deliver high spectral efficiency with ability to activate a large pool of mobile users. A network should be designed to be packet-switched, and leverage existing standard-based architectures. A network should have minimal latency (less than 100 ms) to support interactive applications. A network should support transparent access between wireless local area network (LAN) and wireless wide area network (WAN). A network should support subscriber identification and differentiation through industry standard data policies. A network should support toll-quality packet voice applications and "instant connect" services. A network should support multicast for bandwidth efficiency, and streaming applications. A network should provide high, end-to-end security for web-based financial transactions. A network should support end-to-end Internet protocol (IP) Quality of Service (QoS), wherein QoS is typically represented by metrics that affect the quality of a data service that is delivered to the mobile station (e.g., throughput, bit error rate (BER), delay, etc.).

In a mobile station, the QoS affects the power consumption, otherwise known as battery life, which directly affects the duration of time that the mobile station can operate before the battery needs to be recharged or replaced. It would be desirable for the mobile station to support multiple levels of QoS support to permit various compromises between QoS and power consumption, depending on various factors, such as the quality of the channel, the type of data service, etcetera. For example, some users might desire "instant access" without caring about the power consumption (e.g., in fixed wireless access environment). Other users might desire efficient power consumption, while tolerating longer packet access delay.

Today's predominant mobile technologies, namely second and third generation cellular technologies, were conceived and designed before the birth of the World Wide Web and the explosion of the Internet. These technologies were optimized for voice applications and do not effectively meet the present and anticipated mass-market demand for mobile broadband services. Accordingly, there is a need for a medium access control (MAC) protocol for a wireless communication system that overcomes the disadvantages mentioned above.

SUMMARY OF THE INVENTION

According to one aspect of the present invention, a wireless communication system includes a network, one or more mobile stations, and a medium access control (MAC) protocol. The MAC protocol includes a state transition design and a control channel design. The state transition design includes null, dormant, standby, and active states for each mobile station. The control channel design includes a common control channel, a slow control channel and a fast control channel, and is adapted to control communications from the network to each mobile station.

These and other aspects and features of the present invention will become apparent to those of ordinary skill in the relevant art upon review of the following detailed description of the preferred embodiments of the present invention in conjunction with the accompanying figures, wherein the same reference numbers are assigned to the same features or elements illustrated in different figures. Note that the figures may not be drawn to scale. Further, there may be other embodiments of the present invention explicitly or implicitly described in the specification that are not specifically illustrated in the figures and visa versa.

DETAILED DESCRIPTION OF THE PREFERRED EMBODIMENTS

Figure 1:
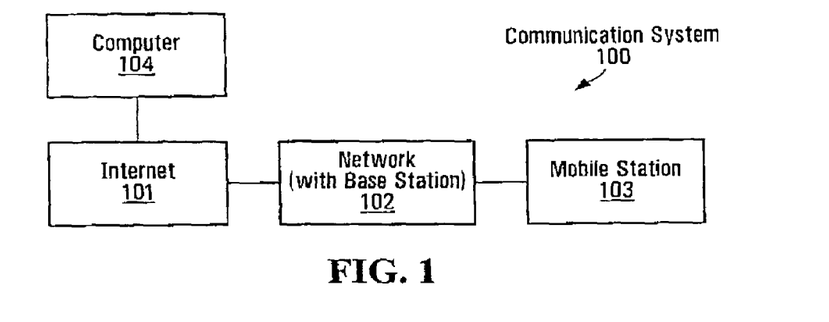
FIG. 1 illustrates a block diagram of a communication system, including an Internet, a network, a mobile station, and a computer in accordance with the preferred embodiments of the present invention.

FIG. 1 illustrates a block diagram of a communication system 100, including an Internet 101, a network 102, a mobile station 103, and a computer 104, in accordance with the preferred embodiments of the present invention. Preferably, the communication system 100 is compatible with presently known third generation (3G) wireless systems and corresponding standards (e.g., cdma2000 (code division multiple access 2000), 3GPP (third generation partnership project), and HDR (high data rate)). Alternatively, the communication system 100 may also be compatible with future high-speed wireless systems and corresponding standards (e.g., fixed or mobile).

The Internet 101 is a global network connecting millions of computers, as is well known to those skilled in the relevant art. Unlike online services, which are centrally controlled, the Internet is decentralized by design. Typically, the Internet 101 is public, but, alternatively or in combination, may be private.

The network 102 is electrically coupled to the Internet 101. The network 102 includes routing and Internet Protocol (IP) transport infrastructure that provides connectivity between base stations, back end systems, and the public Internet 101. The network 102 is typically provisioned to provide an adequate quality of service (QoS). Preferably, an adaptive protocol that provides multiple levels of QoS is employed, as described herein. The network 102 connects the public Internet via one or, preferably, more gateway routers, which also act as firewalls. The back end systems are connected to the network 102 and perform a variety of tasks, such as transporting or communicating information. The back end systems include, but are not limited to: authentication, authorization, and accounting (AAA) servers, local web servers, cached web servers, home agents that forward packets to "remote" users, gateways (e.g., a voice over IP (VoIP) gateway that interfaces the network 102 to the public switched telephone network, business and operational support systems, other services as required: file transfer protocol (FTP), news, mail, etc. The base stations are connected to the network 102 via an IP backhaul link, which may include one or more of T1, ISDN, PRI, cable, DSL, ATM, or any other convenient means that is capable of the required data rate. The base stations manage all wireless connectivity between the network 102 and the mobile station 103. The wireless connectivity includes, without limitation, radio frequency (RF) or infrared (IR) communications.

The mobile station 103 is electrically coupled to the network 102. The mobile station 103 includes, without limitation, a personal digital assistant (PDA), a handheld or pocket PC (personal computer), a PC card, a notebook PC, a wireless handset, a web pad or tablet, and a multimedia audio or video player (e.g., MP3). The wireless handset also may be called a mobile terminal, subscriber unit, radiotelephone, hand phone, portable phone, cellular phone, smart phone, and the like.

The computer 104 is electrically coupled to the Internet 101. The computer 104 includes, without limitation, a mobile station, as defined herein, a desktop computer, a server, a workstation, a notebook computer, a personal computer, a main frame, and the like. The computer 104 may be fixed or mobile. The mobile station 103 communicates with the computer 104 via the network 102 and the Internet 101. Alternatively, the computer 104 may be connected to the network 102, be part of the network 102, or be part of the Internet 101. Hence, the computer 101 generally represents anything that the mobile station 103 communicates with.

The applications and content of the communication system 100 preferably requires a high speed connection and include, without limitation, a virtual private network (VPN) client and server, voice, video conferencing, data and multimedia compression technologies, multimedia streaming (e.g., MPEG-1, 2 and 4 video and audio platforms), mobile commerce, file transfer utilities, web caching, online gaming.

Figure 2:
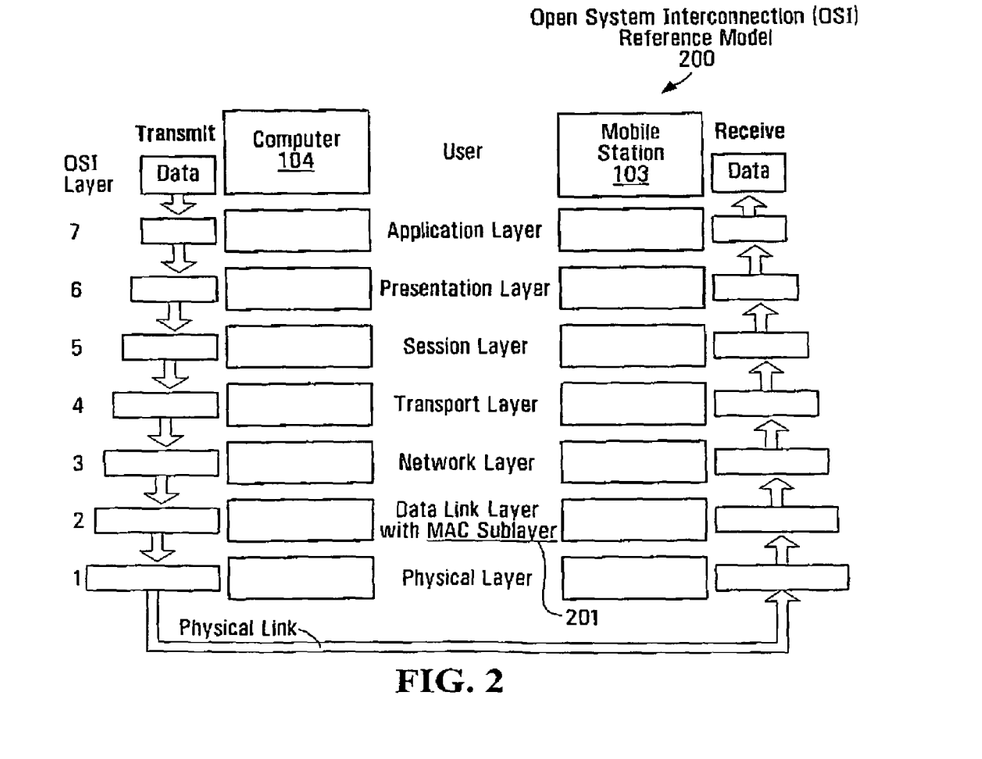
FIG. 2 illustrates an open system interconnection (OSI) reference model for use with the communication system, as shown in FIG. 1, in accordance with the preferred embodiments of the present invention.

FIG. 2 illustrates an open system interconnection (OSI) reference model 200 for use with the communication system 100, as shown in FIG. 1, in accordance with the preferred embodiments of the present invention. The Open System Interconnection (OSI) reference model was developed by the International Standards Organization (ISO) for worldwide communications that defines a networking framework for implementing protocols in seven layers. The seven layers include, in order from layer one to layer seven, the physical layer, the data link layer, the network layer, the transport layer, the session layer, and the application layer, respectively. Control is passed from one layer to the next, starting at the application layer in the computer 104, proceeding to the bottom layer, over the channel and back up the hierarchy to the mobile station 103. Although FIG. 2 shows the computer 104 transmitting to the mobile station 103, the mobile station 103 may also transmit data to the computer 104. Typically, in most applications, the computer 104 will be transmitting a large amount of data at high speeds to the mobile station 103.

The physical layer conveys a bit stream, represented as an electrical impulse, light or radio signal, over a communication channel through the network at the electrical and mechanical level. It provides the hardware means of sending and receiving data on a carrier, including defining cables, cards and physical aspects. Fast Ethernet, RS232, and asynchronized transmission mode (ATM) are protocols with physical layer components.

The data link layer encodes and decodes data packets into bits. It furnishes transmission protocol knowledge and management and handles errors in the physical layer, flow control and frame synchronization. The data link layer is divided into two sublayers including the Logical Link Control (LLC) sublayer and the Medium Access Control (MAC) sublayer 201. The LLC layer controls frame synchronization, flow control and error checking. The MAC sublayer 201 controls how a computer or device (e.g., mobile station 103 or computer 104) on the network 102 gains access to the data and permission to transmit it. In particular, the MAC sublayer 201 is responsible for moving data packets over a packet-switching network 102 between two computers or devices (e.g., between the mobile station 103 and the computer 104) across a shared channel. The MAC sublayer 201 uses a MAC protocol to ensure that signals sent from different computers or devices across the same channel don't collide. A collision occurs when two or more devices attempt to send a signal along the same channel at the same time, resulting in a garbled message. The MAC protocol is an agreed-upon format for communicating data between two devices. A computer or device must support the right MAC protocol to communicate with other computers. In a wireless communication system, the MAC protocol includes a MAC state transition design and a MAC control channel design. The MAC protocol can be implemented either in hardware or in software. The MAC protocol is described in further detail in the remaining figures.

The network layer provides switching and routing technologies, creating logical paths, known as virtual circuits, for transmitting data from node to node. Routing and forwarding are functions of this layer, as well as addressing, internetworking, error handling, congestion control and packet sequencing.

The transport layer provides transparent transfer of data between end systems, or hosts, and is responsible for end-to-end error recovery and flow control. The transport layer ensures complete data transfer.

The session layer establishes, manages and terminates connections between applications. The session layer sets up, coordinates, and terminates conversations, exchanges, and dialogues between the applications at each end. The session layer deals with session and connection coordination.

The presentation layer provides independence from differences in data representation (e.g., encryption) by translating from application to network format, and vice versa. The presentation layer works to transform data into the form that the application layer can accept. This layer formats and encrypts data to be sent across a network, providing freedom from compatibility problems. The presentation layer is sometimes called the syntax layer.

The application layer supports application and end-user processes. Communication partners are identified, quality of service (QoS) is identified, user authentication and privacy are considered, and any constraints on data syntax are identified. Everything at this layer is application-specific.

This layer provides application services for file transfers, e-mail, and other network software services. Telnet and file transfer protocol (FTP) are applications that exist entirely in the application level. Tiered application architectures are part of the application layer.

Figure 3:
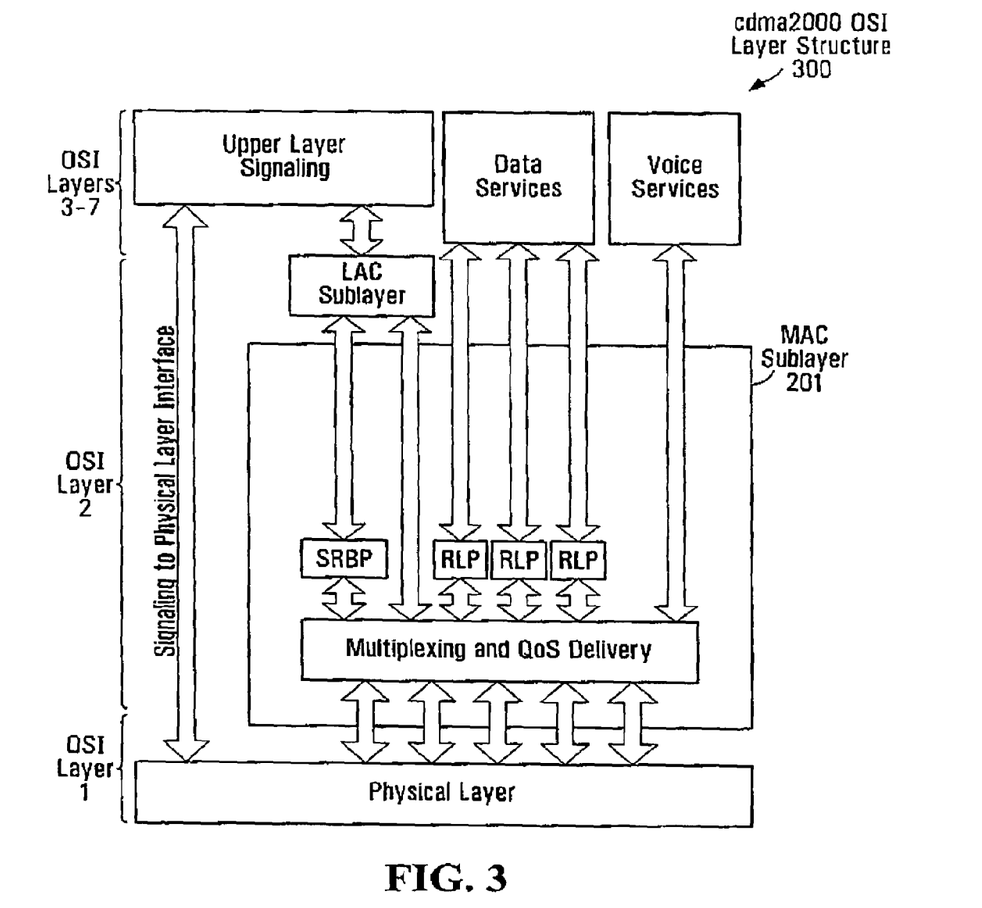
FIG. 3 illustrates a code division multiple access 2000 (cdma2000) layer structure for use with the OSI reference model, as shown in FIG. 2, in accordance with the preferred embodiments of the present invention.
Figure 9:
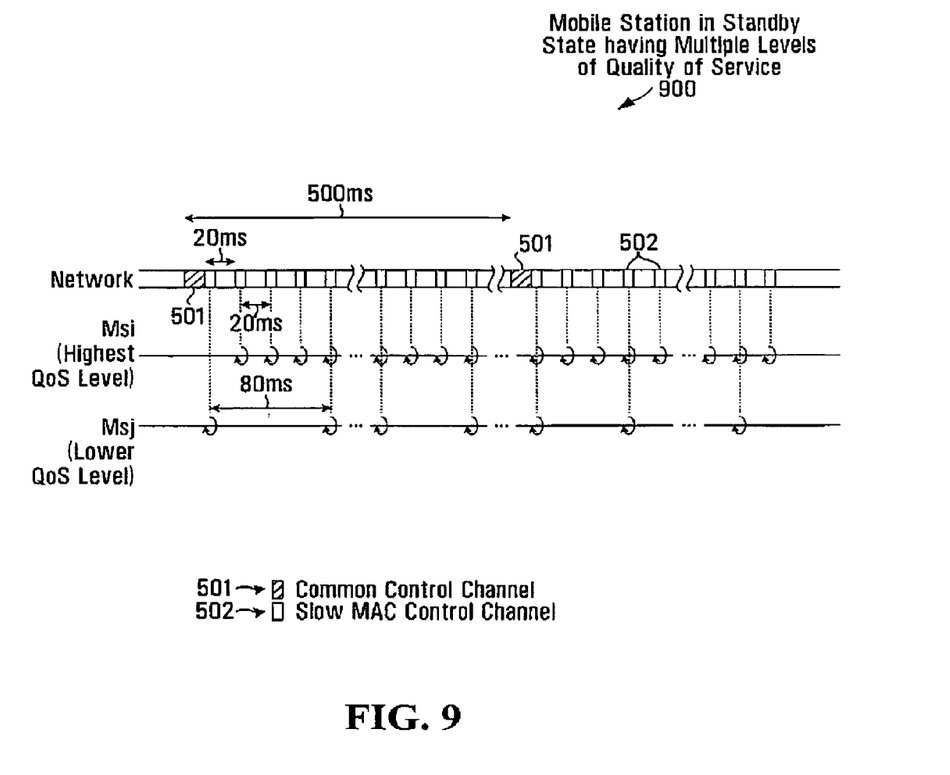
FIG. 9 illustrates synchronized paging for the mobile station in the standby state with multiple levels of Quality of Service (QoS) support for use with the MAC control channel, as shown in FIG. 5, in accordance with the preferred embodiments of the present invention.

FIG. 3 illustrates a code division multiple access 2000 (cdma2000) layer structure 300 for use with the OSI reference model 200, as shown in FIG. 2, in accordance with the preferred embodiments of the present invention. The cdma2000 layer structure 300 employs the Medium Access Control (MAC) Standard For cdma2000 Spread Spectrum Systems (i.e., "MAC Standard"), prepared by the third generation partnership project (3GPP). The cdma2000 MAC sublayer 201 provides two important functions: best effort delivery provides reasonably reliable transmission over the radio link with a radio link protocol (RLP) that provides a "best effort" level of reliability; and multiplexing and quality of service (QoS) control providing enforcement of negotiated QoS levels by mediating conflicting requests from competing services and by the appropriate prioritization of access requests. The competing services include multimedia services that support multiple, concurrent voice, packet data, and circuit data services, each with varying QoS requirements. FIG. 9, and the related description, describes the mobile station 103 having multiple levels of QoS support.

Figure 4:
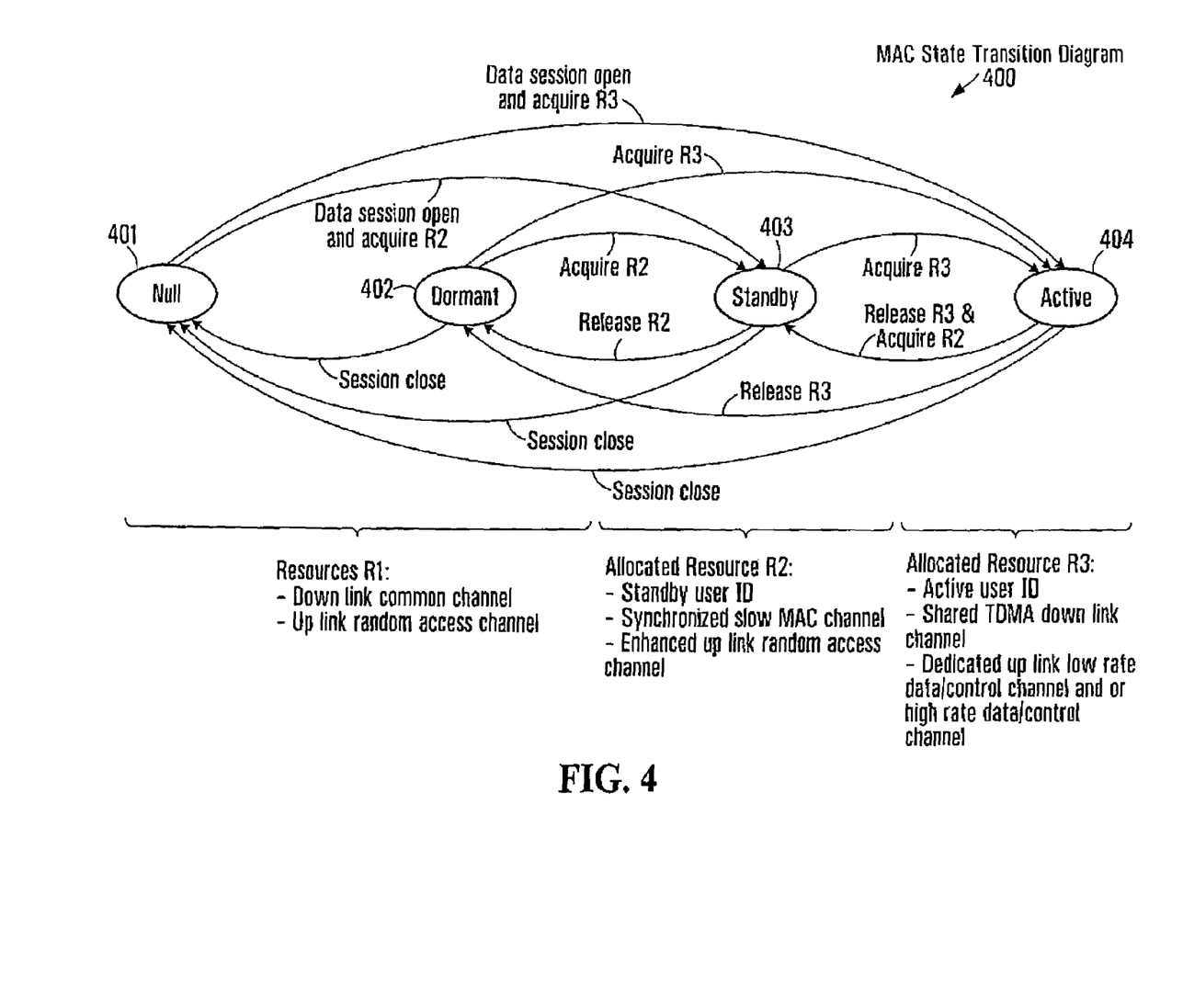
FIG. 4 illustrates a medium access control (MAC) state transition diagram for use with the cdma2000 layer structure, as shown in FIG. 3, in accordance with the preferred embodiments of the present invention.

FIG. 4 illustrates a medium access control (MAC) state transition diagram 400 for use with the cdma2000 layer structure 300, as shown in FIG. 3, in accordance with the preferred embodiments of the present invention. The MAC state transition diagram 400 represents the state of the mobile station 103. The MAC state transition diagram 400 has four states including a null state 401, a dormant state 402, a standby state 403, and an active state 404. The MAC Standard employs the null state 401, the dormant state 402, and the active state 404, as is well known to those skilled in the relevant art. The standby state 403 is a new state, preferably, to be employed by the MAC Standard in combination with the other three states, as shown in FIG. 4.

The following description describes only the six state transitions that employ the standby state 403, as shown in FIG. 4, since the remaining state transitions, employing the null state 401, the dormant state 402 and the active state 404, are already well known to those skilled in the relevant art. Each of the state transitions may be initiated by either the network 102 or by the mobile station 103, depending on various conditions. Preferably, but not required, the state transition from the null state 401 to the standby state 403 is only initiated by the mobile station 103.

The null state 401 is the state of the data service in which no data service has been activated, no service option has been connected, and no forward or reverse dedicated channels are allocated, as is well known to those skilled in the relevant art. In the null state 401, the mobile station 103 or the network 102 may attempt to connect a data service option, and the mobile station 103 or the network 102 may initiate the authorization process for usage of a data service. The null state 401 uses resources, R1, including a down link common channel and an up link random access channel, as is well known to those skilled in the relevant art.

The dormant state 402 is the state of the data service in which no dedicated logical channels are maintained, the service option is disconnected, but the link layer connection for the data service instance between the mobile station 103 and the network 102 is maintained and the network 102 maintains the mapping, as is well known to those skilled in the relevant art. The dormant state 402 uses resources, R1, including a down link common channel and an up link random access channel, as is well known to those skilled in the relevant art. Note that the dormant state 402 is called an idle state in the high data rate (HDR) standard.

The active state 404 is the state of the data service in which the dedicated traffic channel and the dedicated MAC control channel are maintained, as is well known to those skilled in the relevant art. The active state 404 uses resources, R3, including an active user identification (ID), a shared time division multiple access (TDMA) down link channel, a dedicated up link low rate data/control channel and/or high rate data/control channel, as is well known to those skilled in the relevant art.

The standby state 403 is the state of the data service in which a synchronized slow MAC control channel, and an enhanced up link random access channel are maintained. The standby state 403 uses resources, R2, including a standby user ID, a synchronized slow MAC control channel, and an enhanced up link random access channel. The standby state 403 advantageously keeps a light connection between the mobile terminal 103 and the network 102 to minimize packet access delay and to support multiple levels of QoS versus power consumption preferences.

The standby state 403 involves six state transitions including: from the standby state 403 to the active state 404, from the active state 404 to the standby state 403, from the standby state 403 to the dormant state 402, from the dormant state 402 to the standby state 403, from the standby state 403 to the null state 401, and from the null state 401 to the standby state 403.

During the state transition from the standby state 403 to the active state 404, the mobile station 103 releases the communication resources, R2, and acquires the communication resources, R3. During the state transition from the active state 404 to the standby state 403, the mobile station 103 releases the communication resources, R3, and acquires the communication resources, R2. During the state transition from the standby state 403 to the dormant state 402, the mobile station 103 releases the communication resources, R2. During the state transition from the dormant state 402 to the standby state 403, the mobile station 103 acquires the communication resources, R2. The state transition from the dormant state 402 to the standby state 403 may or may not be used, depending on various engineering design considerations. During the state transition from the standby state 403 to the null state 401, the data session is closed and the mobile station 103 releases the communication resources, R2. During the state transition from the null state 401 to the standby state 403, a data session is opened and the mobile station 103 acquires the communication resources, R2.

In a wireless network, mobile stations 103 communicate with base stations via air interfaces. Mobile stations 103 may not wish to always transmit and/or receive data. In fact, at any given time, a high percentage of the mobile stations 103 are in an idle mode. In that case, it is desirable for the battery operated mobile station 103 to reduce its power consumption by entering the null state 401, the dormant state 402 or the standby state 403. While in the idle mode, mobile stations 103 may move from one base station's coverage area to another and still be contactable. Contacting an idle mobile station 103 is commonly referred to as paging. Paging is used in conjunction with registration, which is a process by which the mobile station 103 informs the network 102 of its location. The network 102 tracks the mobile station 103 through paging/registration procedures. Paging support optimizes the network 102 with the following goals: (a) to reduce signaling costs (airline and network) associated with mobile station 103 location tracking by requiring mobile stations 103 to signal only when crossing a paging area rather than each time it establishes a connection to another base station; and (b) to reduce power consumption of battery operated mobile stations 103, by allowing them to turn off some or all transmitter/receiver functions. In order to support paging, a wireless system must employ paging areas, where the mobile station 103 is free to move without having to re-register with the current base station. The idle mobile station 103 must periodically "wake up" and determine the identifier of the base station that it finds the strongest in term of air link quality. This information should help the mobile station 103 determine whether or not it is located in the same paging area, i.e. whether it is still reachable. If the mobile station 103 has left the paging area where it most recently registered, then the mobile station 103 must register anew.

Hence, the standby state 403 provides an intermediate state between the dormant state 402 and the active state 404 that is functionally more awake than each of the null state 401 and the dormant state 402, but less awake than the active state 404. When the mobile station 103 is in the standby state 403, it can wake up to the active state 404 faster than if it was in the null state 401 or the dormant state 402 to advantageously minimize the packet access delay time. When the mobile station 103 is in the standby state 403, the mobile station 103 consumes more power than if it was in the null state 401 or the dormant state 402, but less power than if it was in the active state 404, assuming a fixed QoS level. However, FIG. 9 and the related description describes the mobile station 103 employing a QoS level that varies with the power consumption of the mobile station 103, when the mobile in the standby state 403.

Figure 5:
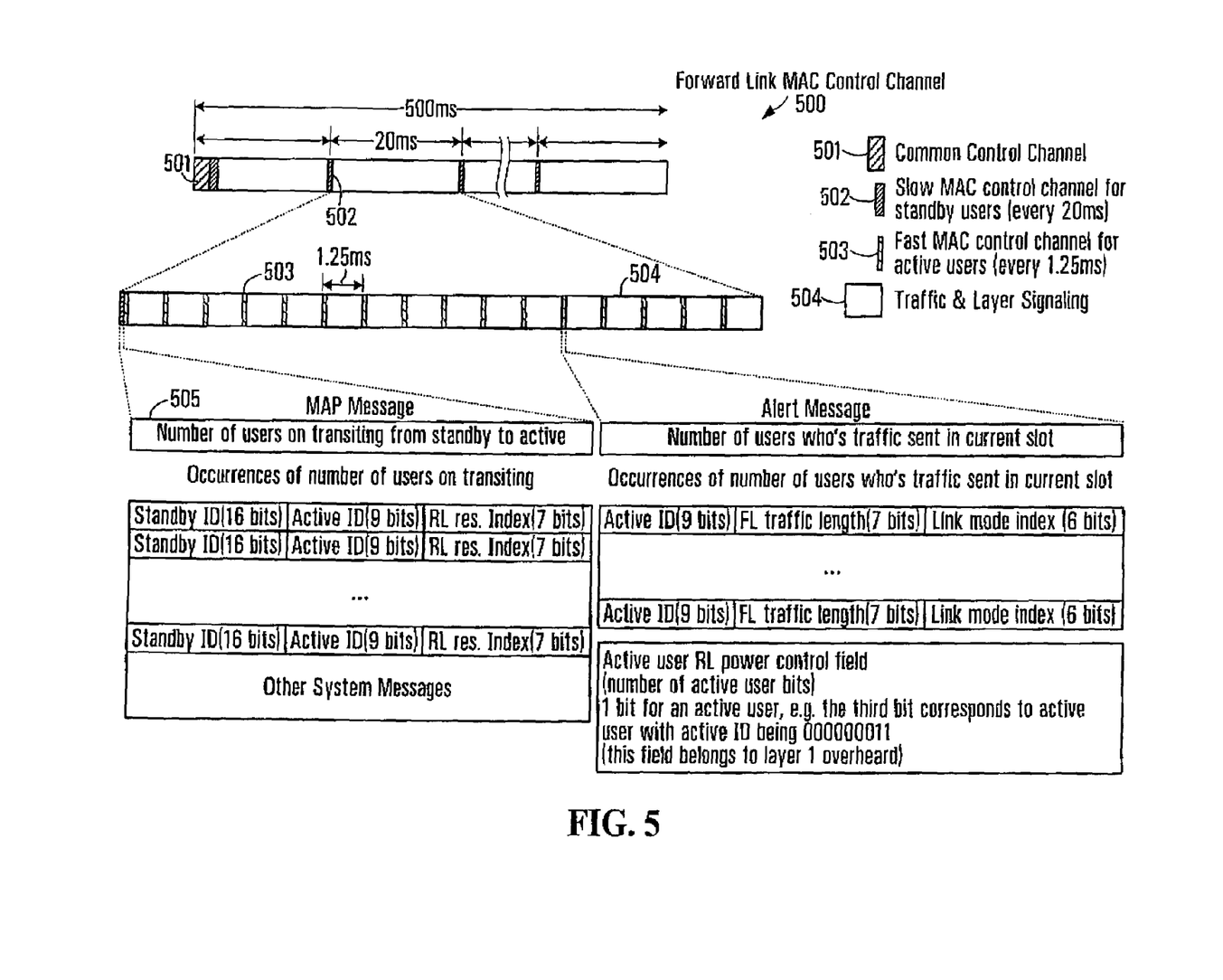
FIG. 5 illustrates a MAC control channel for use with the MAC state transition diagram, as shown in FIG. 4, in accordance with the preferred embodiments of the present invention.

FIG. 5 illustrates a MAC control channel 500 for use with the MAC state transition diagram 400, as shown in FIG. 4, in accordance with the preferred embodiments of the present invention. The network 102 and the mobile station 103 communicate messages over the MAC control channel 500. The MAC control channel 500 generally includes a common control channel 501, a slow MAC control channel 502, a fast MAC control channel 503, and a data traffic channel 504. A map message 505 and an alert message 506 are transmitted over the MAC control channel 500.

A forward link represents a communication from the network 102 to the mobile station 103, and a reverse link represents a communication from the mobile station 103 to the network 102. Typically, the bandwidth (i.e., data rate) of the forward link is much larger than the bandwidth of the reverse link. The network 102 typically communicates a large amount of data (e.g., video, audio, data) to the mobile station 103 over the forward link. Whereas, the mobile station 103 typically communicates a small amount of data (e.g., commands, requests) to the network 102 over the reverse link.

The network 102 periodically sends messages to the mobile station 103, in the null state 401 or the dormant state 402, over the common control channel 501 (e.g., every 500 ms), as is well known to those skilled in the relevant art.

The network 102 communicates messages with the mobile station 103, in the active state 404, over the fast MAC control channel 503 (e.g., every slot, 1.25 ms), as is well known to those skilled in the relevant art. The fast MAC control channel 503 includes an alert message. The alert message 506 generally identifies the number of mobile stations 103 whose data traffic is sent in the current time slot, occurrences of the number of mobile station 103 whose data traffic is sent in the current time slot and power control bits for each mobile station 103 in active state for the purpose of reverse link power control. Each occurrence is for one mobile state 103 and includes an active ID (e.g., 9 bits) assigned to this mobile station 103, a forward link (FL) traffic length (e.g., 7 bits) indicating where the traffic data belong to this mobile station 103, and link mode index (e.g., 6 bits) indicating the physical layer coding and modulation parameters, as is well known to those skilled in the relevant art.

The network 102 periodically sends messages, including map messages 505, to the mobile station 103, in the standby state 403, over the slow MAC control channel 502 (e.g., every 20 ms). The term "slow" in the slow MAC control channel 502 is a relative, non-limiting, term because it is slower than the fast MAC control channel 503. However, the slow MAC control channel 502 is faster than the common control channel 501. The slow MAC control channel 502 advantageously permits the mobile station 103 to transition from the standby state 403 to the active state 404 to acquire the access to the network 102 in about 100 ms (i.e., packet access delay time over the forward link). A 100 ms access time is comparable to conventional wire line access times.

The map message 505 generally identifies the number of mobile stations 103 that are transitioning from the standby state 403 to the active state 404, occurrences of the number of mobile station 103 that are transitioning from the standby state 403 to the active state 404, and some other system messages. The occurrence for each mobile station 103 includes a standby ID (e.g., 16 bits), an active ID (e.g., 9 bits) assigned to this mobile station 103, and a reverse link (RL) index (e.g., 7 bits) indicating reverse link assignment. The standby ID, assigned to a mobile station 103 in the standby state 403, represents an improvement over an otherwise conventional mobile station ID. Assigning multiple level IDs, such as a mobile station ID, the standby ID and the active ID, to mobile station 103 reduces overhead.

Figure 6:
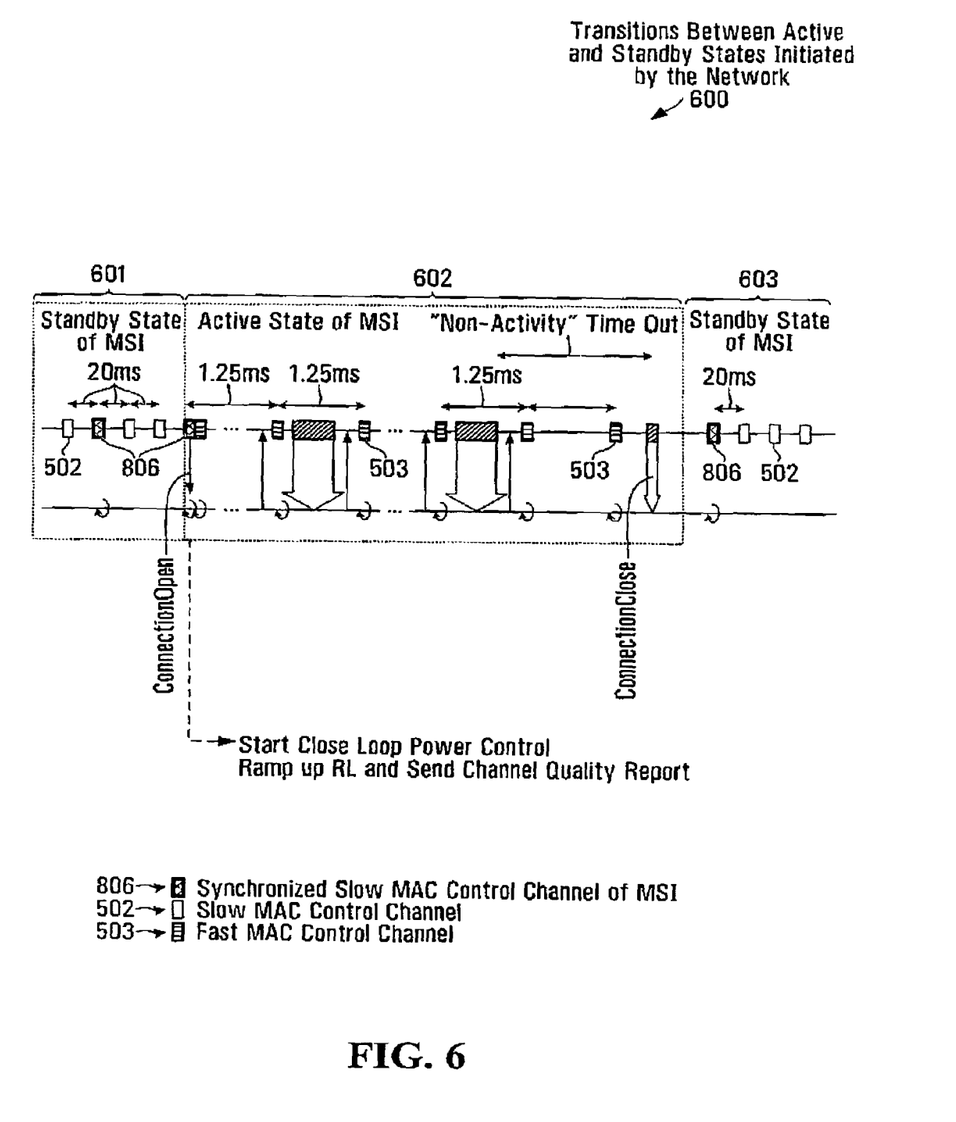
FIG. 6 illustrates a state transition from the standby state to the active state and from the active state to the standby state initiated by the network for use with the MAC control channel, as shown in FIG. 5, in accordance with the preferred embodiments of the present invention.

FIG. 6 illustrates a state transition from the standby state 403 to the active state 404 and from the active state 404 to the standby state 403 initiated by the network for use with the MAC control channel 500, as shown in FIG. 5, in accordance with the preferred embodiments of the present invention. FIG. 6 includes a first time period 601, a second time period 602 and a third time period 603, representing the duration of time that the mobile station 103 is in the standby state 403, the active state 404, and the standby state 403, respectively.

The mobile station 103 begins in the standby state 403 in the first time period 601 and listens (graphically represented by a profile of a human ear) to the synchronized MAC slow control channel 806. In the standby state 403, the mobile station 103 receives the standby ID and the active ID present on the slow MAC control channel 502. The mobile station 103 transitions from the standby state 403 to the active state 404 by entering close loop power control, by ramping up the reverse link, and by sending channel quality reports, represented by a narrow bandwidth arrow, to the network 102 during every time slot. The network 102 sends data traffic, represented by the wide bandwidth arrow, to the mobile station 103 over the traffic channel 504 responsive to the channel quality report or the preferred data rate.

The mobile station 103 transitions from the active state 404 to the standby state 403 responsive to the network 102 deciding that the mobile station 103 has been non-active in the active state 404 for a period of time based on the type of data service and the QoS. When the period of time lapses, the network 102 sends a connection close request to the mobile station 103 allocates a new standby ID and de-allocates the active ID and reverse link resource. For a period of time while the mobile station 103 transitions from the active state 404 to the standby state 403, the mobile station 103 monitors the slow MAC control channel 502 at the fastest time period (e.g., 1.25 ms) before continuing to monitor the synchronized MAC slow control channel 806.

Figure 7:
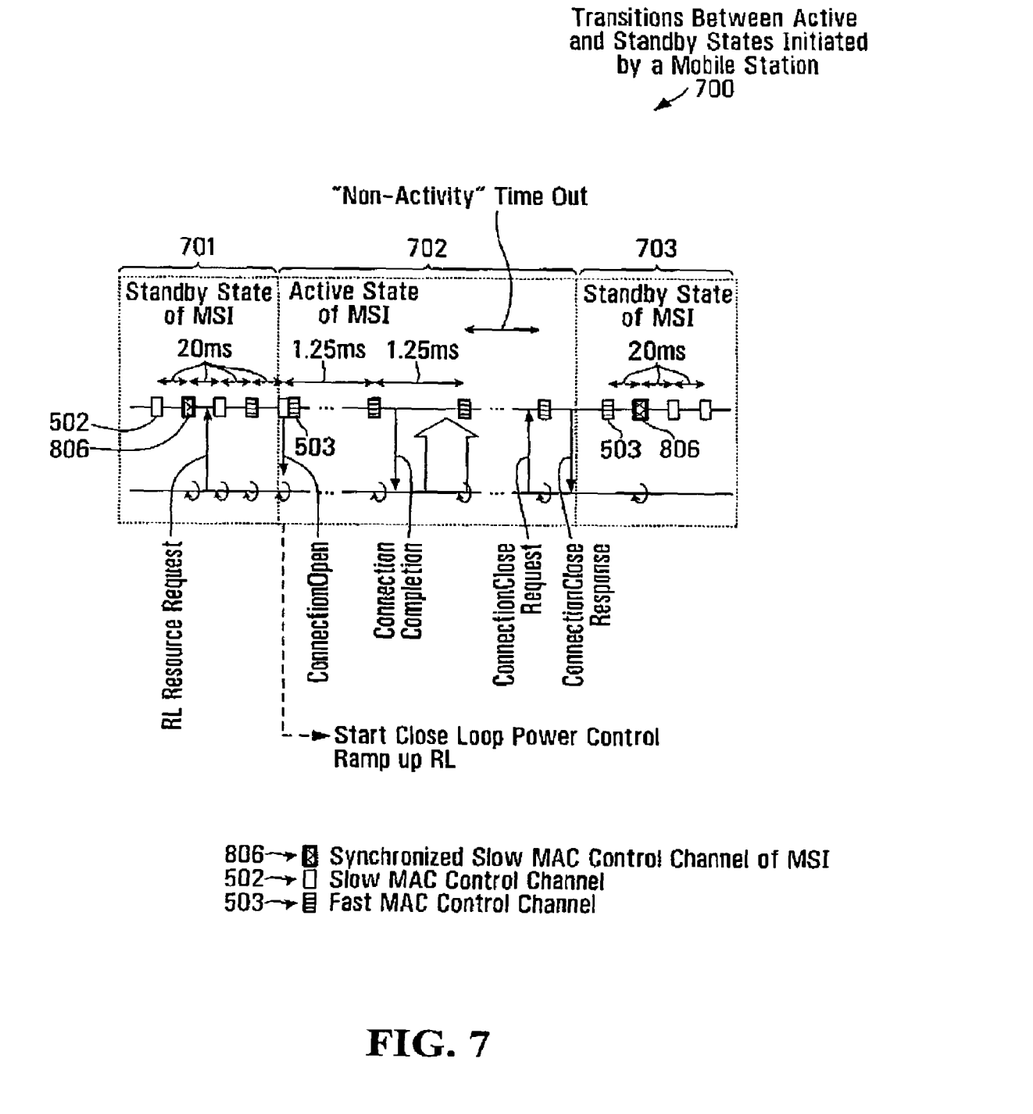
FIG. 7 illustrates a state transition from the standby state to the active state and from the active state to the standby state initiated by a mobile station for use with the MAC control channel, as shown in FIG. 5, in accordance with the preferred embodiments of the present invention.

FIG. 7 illustrates a state transition from the standby state 403 to the active state 404 and from the active state 404 to the standby state 403 initiated by the mobile station 103 for use with the MAC control channel 500, as shown in FIG. 5, in accordance with the preferred embodiments of the present invention. FIG. 7 includes a first time period 701, a second time period 702 and a third time period 703, representing the duration of time that the mobile station 103 is in the standby state 403, the active state 404, and the standby state 403, respectively.

The mobile station 103 begins in the standby state 403 in the first time period 701 and listens to the MAC slow control channel 502. In the standby state 403, the mobile station 103 sends a reverse link (RL) resource request, including standby user ID, required data payload, and associated QoS, to the network 102. The network 102 sends a connection open response, including the standby user ID, the assigned active user ID, and the assigned RL resource to the mobile station 103 responsive to receiving the RL resource request from the mobile station 103. The mobile station 103 then enters a close loop power control and ramps up reverse link. The network 102 sends a connection completion response responsive to receiving the reverse link. Then the mobile station 103 sends data to the network 102, represented by the wide bandwidth arrow, over the reverse link.

The mobile station 103 transitions from the active state 404 to the standby state 403 responsive to the mobile station 103 deciding that the mobile station 103 has been non-active in the active state 404 for a period of time based on the type of data service and the QoS. When the period of time lapses, the mobile station 103 sends a connection close request to the network 102. The network 102 sends a connection close response to the mobile station 103 and allocates a new standby ID and de-allocates the active ID and reverse link resource responsive to receiving the connection close request from the mobile station 103. For a period of time while the mobile station 103 transitions from the active state 404 to the standby state 403, the mobile station 103 monitors the MAC slow control channel 502 at the fastest time period (e.g., 1.25 ms) before continuing to monitor the synchronized MAC slow control channel 806.

Figure 8:
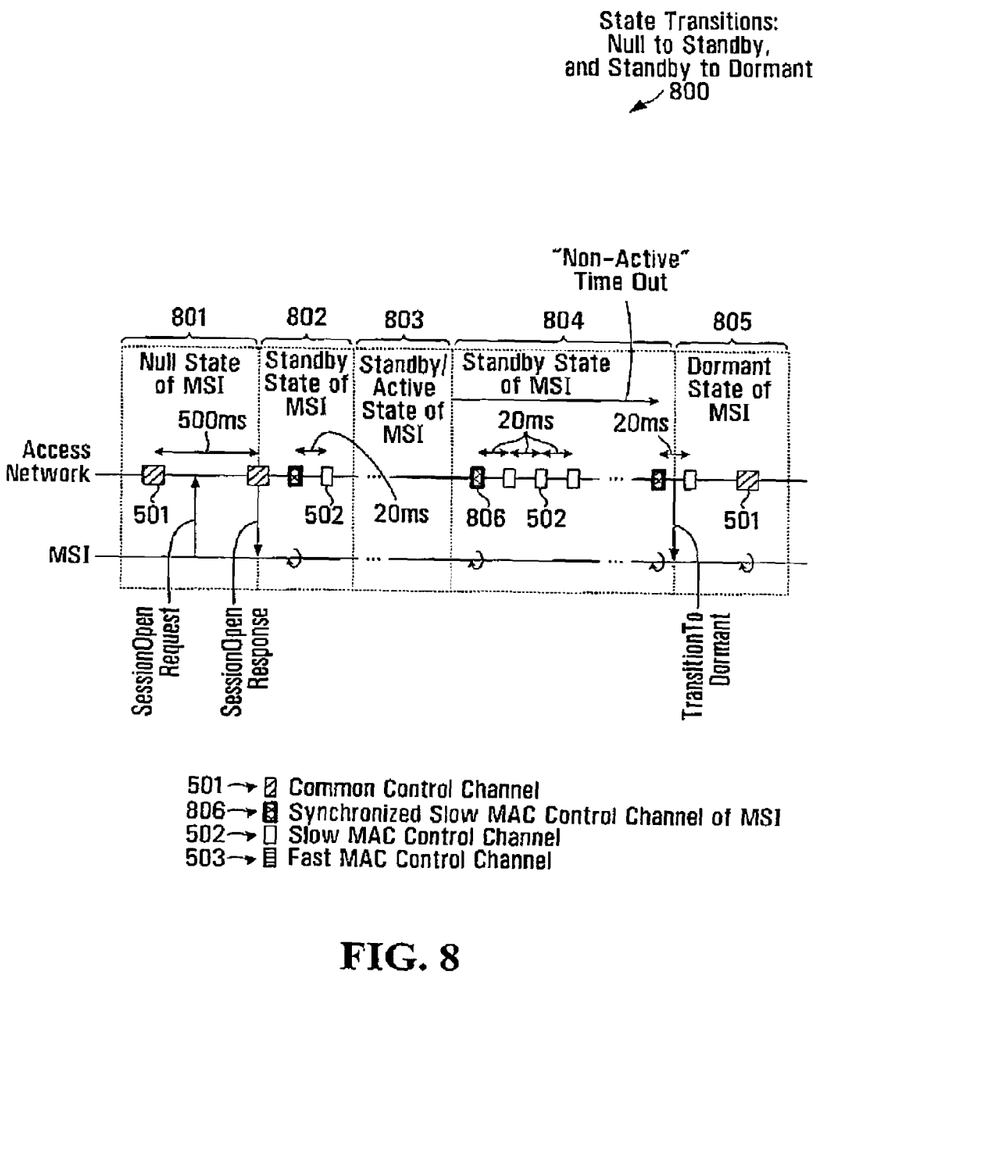
FIG. 8 illustrates a state transition from the null state to the standby state and from the standby state to the dormant state for use with the MAC control channel, as shown in FIG. 5, in accordance with the preferred embodiments of the present invention.

FIG. 8 illustrates a state transition from the null state 401 to the standby state 403 and from the standby state 403 to the dormant state 402 for use with the MAC control channel 500, as shown in FIG. 5, in accordance with the preferred embodiments of the present invention. FIG. 8 includes a first time period 801, a second time period 802 and a third time period 803, a fourth time period 804, and a fifth time period 805, representing the duration of time that the mobile station 103 is in the null state 401, the standby state 403, the standby state 403 or active state 404, the standby state 403, and the dormant state 402, respectively.

The mobile station 103 begins in the standby state 403 in the first time period 801 and listens to the common control channel 501. The mobile station 103 sends a session open request to the network 102 to open a session. The network 102 sends a session open response to the mobile station 103 to assign a standby user ID and synchronized MAC slow control channel 806, etcetera. In the second time period 802, the mobile station 103 continues to monitor the synchronized MAC slow control channel 806.

During the third time period 803, the mobile station 103 may be either in the standby state 403 or the active state 404.

During the fourth time period 804, the mobile station 103 transitions from the standby state 403 to the dormant state 402 responsive to the mobile station 103 or the network 102 deciding that the mobile station 103 has been non-active in the standby state 403 for a period of time. When the period of time lapses, the mobile station 103 sends a connection close request to the network 102. The network 102 sends a session close response to the mobile station 103 and de-allocates the standby ID responsive to receiving the connection close request from the mobile station 103.

During the fifth time period 805, the mobile station 103 transitions from the standby state 403 to the dormant state 402, wherein the mobile station 103 monitors the common control channel 501.

FIG. 9 illustrates synchronized paging for the mobile station 103 in the standby state 403 with multiple levels of Quality of Service (QoS) support for use with the MAC control channel 500, as shown in FIG. 5, in accordance with the preferred embodiments of the present invention. Preferably, the mobile station 103 controls the multiple levels of the QoS, but, alternatively, may be controlled by network 102.

While in the standby state 403, the mobile station 103 monitors the slow MAC control channel 502 every 20 ms or an integer times of 20 ms (i.e., N×20 ms). The parameter N is based on the QoS requirement (e.g., packet access delay) and/or power consumption status and can be set at session setup or changed during a session. Preferably, when N>1, a synchronized communications between the network 102 and the mobile station 103 are required. The resulting slow control channel 502, having the messages sent to the mobile station 103, is called a synchronized slow control channel 806 of the mobile station 103. Each mobile station 103 monitors its synchronized slow control channel 806 periodically. The synchronized time periods can be different for each mobile station 103. This flexible and adaptive standby state design advantageously permits different QoS requirements (packet access delay) for different power consumption requirements. Hence, the mobile stations adaptively monitor cycles of the MAC slow control channel 502 while in standby state 403 responsive to programmable QoS and power consumption requirements. FIG. 10 shows an estimated performance improvement in terms of packet access delay at the highest QoS while in the standby state 403.

FIG. 10 illustrates a table 1000 comparing characteristics of conventional protocols to the MAC protocols, as shown in FIGS. 2-9, in accordance with the preferred embodiments of the present invention. In table 1000, characteristics of the MAC channel and states are shown in column one, in accordance with the preferred embodiments of the present invention. The conventional protocols include 1×RTT (One Times Radio Transmission Technology—a phase of cdma2000 technology), 3GPP (third generation partnership project), and HDR (high data rate), as shown in columns two, three and four. The MAC protocol of the present invention, as shown and described herein, is shown in column five.

The characteristics of the MAC channel include the fast MAC channel, the slow MAC channel, and the common control channel, as shown in row 2. The characteristics of the MAC states include the dormant to active state, as shown in row three. The characteristic of the MAC channel having multiple QoS support is shown in row four.

Each of the conventional protocols and the MAC protocol of the present invention use the fast MAC channel (for the active state), and the common control channel (for the dormant state (1×RTT, 3GPP, and HDR) and the idle state (MAC protocol of the present invention)). Only the MAC protocol of the present invention uses the slow MAC channel for the standby state.

The packet access delay performance for the state transition from the dormant state to active state is about 3.6 seconds for 1×RTT, 1.0 second for 3GPP, 500 milliseconds (continue course monitor mode) or 5 seconds (sleep mode) for HDR, and 100 milliseconds for the MAC protocol of the present invention. Hence, the MAC protocol of the present invention has the lowest delay to provide the fastest message transfer.

Only the MAC protocol of the present invention provides multiple or adaptive QoS support. The conventional systems provide a fixed or static support.

Hence, while the present invention has been described with reference to various illustrative embodiments thereof, the present invention is not intended that the invention be limited to these specific embodiments. Those skilled in the art will recognize that variations, modifications and combinations of the disclosed subject matter can be made without departing from the spirit and scope of the invention as set forth in the appended claims.

What is claimed is:

1. A method of performing medium access control (MAC) to control communications from a network to at least one mobile station, each mobile station undergoing state transitions according to a state transition design, including a null state, a dormant state, a standby state, and an active state, the method comprising:
    the network transmitting to each mobile station according to a control channel design, including a common control channel, a slow control channel, and a fast control channel;
    the network sending communications to each mobile station over the slow control channel when the mobile station is in the standby state to control a next state transition for the mobile station, the communications comprising:
    information identifying how many mobile stations are transitioning from the standby state to the active state; and
    information indicating occurrences of mobile stations that are transitioning from the standby state to the active state.

2. The method of claim 1, wherein one of the network and the mobile station initiates a transition between the standby state and one of the null state, the dormant state and the active state.

3. The method of claim 2, wherein the transition is from the standby state to the active state.

4. The method of claim 2, wherein the transition is from the active state to the standby state.

5. The method of claim 2, wherein the transition is from the standby state to the dormant state.

6. The method of claim 2, wherein the transition is from the dormant state to the standby state.

7. The method of claim 2, wherein the transition is from the standby state to the null state.

8. The method of claim 2, wherein the transition is from the null state to the standby state.

9. The method of claim 1, wherein the network sends communications to each mobile station over the common control channel when the mobile station is in one of the null state and the dormant state.

10. The method of claim 1, wherein the network sends communications to each mobile station over the fast control channel when the mobile station is in the active state.

11. The method of claim 1, wherein the communications, having the information indicating occurrences of mobile stations that are transitioning from the standby state to the active state, comprise:
    a standby identification (ID);
    an active identification (ID); and
    a reverse link (RL) index.

12. A method of performing medium access control (MAC) to control communications from a network to at least one mobile station, each mobile station undergoing state transitions according to a state transition design, including a null state, a dormant state, a standby state, and an active state, the method comprising:
    the network transmitting to each mobile station according to a control channel design, including a common control channel, a slow control channel, and a fast control channel;
    the network sending communications to each mobile station over the slow control channel when the mobile station is in the standby state to control a next state transition for the mobile station;
    each mobile station monitoring the slow control channel when in the standby state according to a selected quality of service (QoS) level of a plurality of QoS levels, each QoS level having a respective periodicity for which the mobile station monitor the slow control channel.

13. The method of claim 12 wherein the periodicity of each QoS level is an integer number times a communication cycle of the slow control channel.

14. The method of claim 12 wherein the periodicity of each QoS level is synchronized between the network and the mobile station.

15. The method of claim 12 wherein the QoS levels are independently selected for each mobile station.

16. The method of claim 12 wherein at least one of the network and the mobile station controls the QoS levels.

17. The method of claim 12 wherein each QoS level relates to a respective power consumption level in the mobile station.

18. A method of performing medium access control (MAC) to control communications between a network and at least one mobile station, each mobile station undergoing state transitions according to a state transition design, including a null state, a dormant state, a standby state, and an active state, the method comprising:
    for each mobile station, one of the network and the mobile station initiating a transition between the standby state and one of the null state, the dormant state and the active state, including at least one of:
    the transition from the standby state to the active state,
    the transition from the active state to the standby state,
    the transition from the standby state to the dormant state,
    the transition from the dormant state to the standby state,
    the transition from the standby state to the null state, and
    the transition from the null state to the standby state; and
    the network transmitting to each mobile station according to a control channel design including a common control channel, a slow control channel, and a fast control channel, wherein the network sends communications to the mobile station;
    over the common control channel when the mobile station is in one of the null state and the dormant state for providing configuration information for use by the mobile station in obtaining service from the network, over the fast control channel when the mobile station is in the active state for providing configuration information for use by the mobile station in obtaining service from the network, and over the slow control channel when the mobile station is in the standby state for controlling a next state transition for the mobile station;

wherein the communications over the slow control channel comprises:

information identifying how many mobile stations are transitioning from the standby state to the active state; and information indicating occurrences of mobile stations that are transitioning from the standby state to the active state.

19. The method of claim 18, wherein the communications, having the information indicating occurrences of mobile stations that are transitioning from the standby state to the active state, comprise:

a standby identification (ID);
an active identification (ID); and
a reverse link (RL) index.

20. A method of performing medium access control (MAC) to control communications between a network and at least one mobile station, each mobile station undergoing state transitions according to a state transition design, including a null state, a dormant state, a standby state, and an active state, the method comprising:

for each mobile station, one of the network and the mobile station initiating a transition between the standby state and one of the null state, the dormant state and the active state, including at least one of:
the transition from the standby state to the active state,
the transition from the active state to the standby state,
the transition from the standby state to the dormant state,
the transition from the dormant state to the standby state,
the transition from the standby state to the null state, and
the transition from the null state to the standby state;
the network transmitting to each mobile station according to a control channel design including a common control channel, a slow control channel, and a fast control channel, wherein the network sends communications to the mobile station:
over the common control channel when the mobile station is in one of the null state and the dormant state for providing configuration information for use by the mobile station in obtaining service from the network,
over the fast control channel when the mobile station is in the active state for providing configuration information for use by the mobile station in obtaining service from the network, and
over the slow control channel when the mobile station is in the standby state for controlling a next state transition for the mobile station;
each mobile station monitoring the slow control channel when in the standby state according to a selected quality of service (QoS) level of a plurality of QoS levels, each QoS level having a respective periodicity for which the mobile station monitors the slow control channel; and
wherein the periodicity of each QoS level is an integer number times a communication cycle of the slow control channel,
wherein the periodicity of each QoS level is synchronized between the network and the mobile station,
wherein the QoS levels are independently selected for each mobile station,
wherein at least one of the network and the mobile station controls the QoS levels, and
wherein each QoS level relates to a respective power consumption level in the mobile station.

21. A network, adapted to perform media access control (MAC) to control communications with at least one mobile station, each mobile station undergoing state transitions according to a state transition design, including a null state, a dormant state, a standby state, and an active state, the network comprising:

a control channel design, including a common control channel, a slow control channel, and a fast control channel, the network being adapted to control communications to each mobile station according to the control channel design;
wherein the network sends communications to each mobile station over the slow control channel when the mobile station is in the standby state for controlling a next state transition for the mobile station, the communications comprising:
information identifying how many mobile stations are transitioning from the standby state to the active state; and
information indicating occurrences of mobile stations that are transitioning from the standby state to the active state.

22. A method of performing medium access control (MAC), to control communications between a network and at least one mobile station, each mobile station undergoing state transitions according to a state transition design, including a null state, a dormant state, a standby state, and an active state, the method comprising:

for each mobile station, one of the network and the mobile station initiating a transition between the standby state and one of the null state, the dormant state and the active state, including at least one of:
the transition from the standby state to the active state,
the transition from the active state to the standby state,
the transition from the standby state to the dormant state,
the transition from the dormant state to the standby state,
the transition from the standby state to the null state, and
the transition from the null state to the standby state; and
the network transmitting to each mobile station according to a control channel design including a common control channel, a slow control channel, and a fast control channel, wherein the network sends communications to the mobile station:
over the common control channel when the mobile station is in one of the null state and the dormant state for providing configuration information for use by the mobile station in obtaining service from the network,
over the fast control channel when the mobile station is in the active state for providing configuration information for use by the mobile station in obtaining service from the network, and
over the slow control channel when the mobile station is in the standby state for controlling a next state transition for the mobile station,
wherein the slow control channel comprises a repeating pattern having an active period followed by a slow control channel inactive period and the fast control channel comprises a repeating pattern having an active period and a fast control channel inactive period, wherein the fast control inactive period is relatively short compared to the slow control channel inactive period.

23. A network, adapted to perform media access control (MAC) to control communications with at least one mobile station, each mobile station undergoing state transitions according to a state transition design, including a null state, a dormant state, a standby state, and an active state, the network comprising:

a control channel design, including a common control channel, a slow control channel, and a fast control channel, the network being adapted to control communications to each mobile station according to the control channel design for controlling a next state transition for the mobile station, or for providing configuration information for use by the mobile station in obtaining service from the network;

wherein the slow control channel comprises a repeating pattern having an active period followed by a slow control channel inactive period and the fast control channel comprises a repeating pattern having an active period and a fast control channel inactive period, wherein the fast control inactive period is relatively short compared to the slow control channel inactive period.

\* \* \* \* \*